W. G. LEATHERS.
SUBMARINE POWER GENERATION.
APPLICATION FILED APR. 4, 1917.

1,359,513.

Patented Nov. 23, 1920.
5 SHEETS—SHEET 1.

Witnesses
R. E. Bates.
E. F. Chandler

Inventor
Ward G. Leathers

W. G. LEATHERS.
SUBMARINE POWER GENERATION.
APPLICATION FILED APR. 4, 1917.

1,359,513.

Patented Nov. 23, 1920.
5 SHEETS—SHEET 4.

Witnesses

Inventor

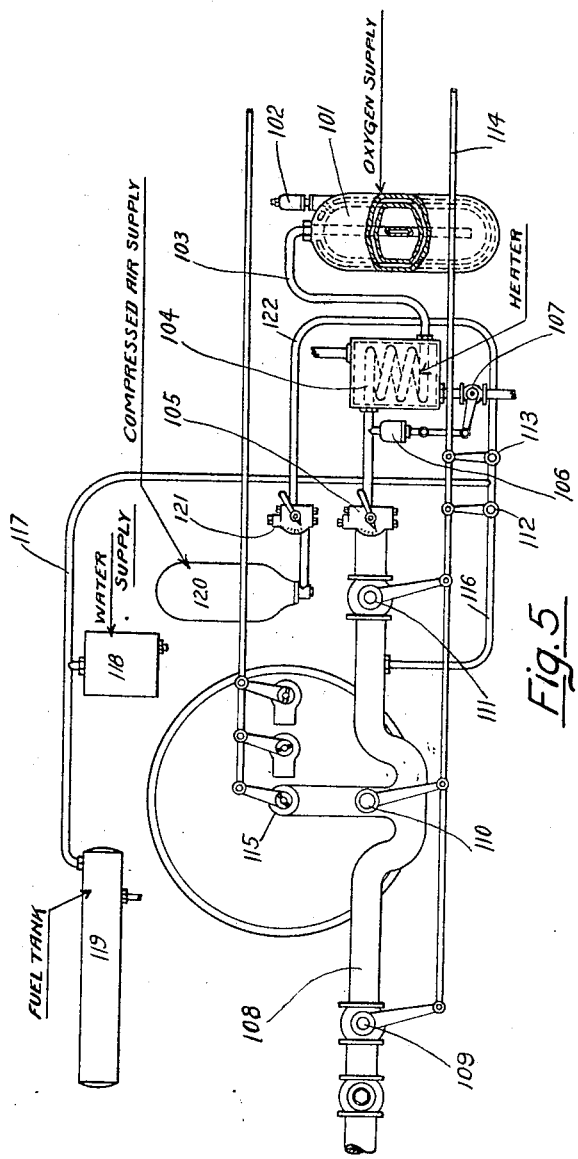

UNITED STATES PATENT OFFICE.

WARD G. LEATHERS, OF HAWORTH, NEW JERSEY, ASSIGNOR TO SUBMARINE ARMS CORPORATION, OF NEW YORK, N. Y.

SUBMARINE POWER GENERATION.

1,359,513.      Specification of Letters Patent.      Patented Nov. 23, 1920.

Application filed April 4, 1917. Serial No. 159,793.

*To all whom it may concern:*

Be it known that I, WARD G. LEATHERS, a citizen of the United States, residing at Haworth, in the county of Bergen and State of New Jersey, have invented certain new and useful Improvements in Submarine Power Generation, of which the following is a specification, reference being had therein to the accompanying drawing.

In the conventional automobile torpedo the power plant together with its fuel is essentially self-contained.

A purpose of the present invention is to furnish a torpedo or other submersible craft with means of obtaining air from the outside atmosphere for the purpose of sustaining combustion and producing power. And it has as a further purpose the providing of means whereby this source of air can be replaced by a self-contained form of combustion supporting medium, at the will of the operator, or when the craft is so submerged that atmosphere air cannot be obtained.

Further advantages and objects will be apparent to those versed in these matters when this specification is read in conjunction with the drawings herewith.

Fig. 5, is a schematic diagram of a generating system embodying a modification of my invention.

My invention makes it possible to furnish power to a torpedo or other submarine craft over very much greater ranges than the present self-contained systems.

Figure 1:
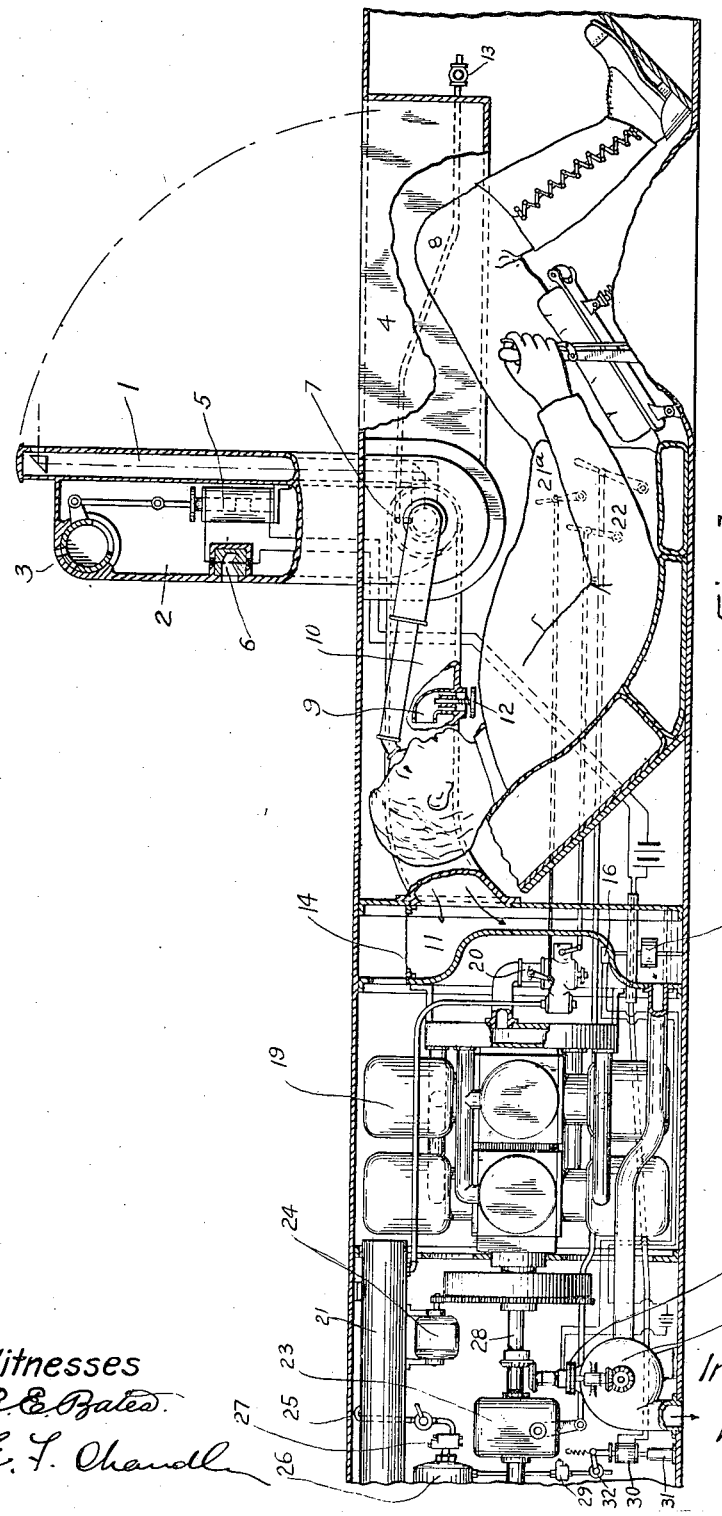
Figure 1 is a vertical section through a part of a dirigible device, showing one embodiment of my invention.

In Fig. 1, I have shown a cross-section of a submersible craft of torpedo proportions with an operator contained therein. I have shown a means of obtaining air from the atmosphere, of separating the water from the air, of furnishing fresh air to the operator, and of supplying air to a prime mover. This figure further illustrates a means of automatically maintaining a relatively constant pressure of air at the intake of the prime mover whether the craft be running on the surface, awash or submerged. I have further illustrated in Fig. 1 an automatic means of closing the air intake when in danger of shipping water.

Figure 2:
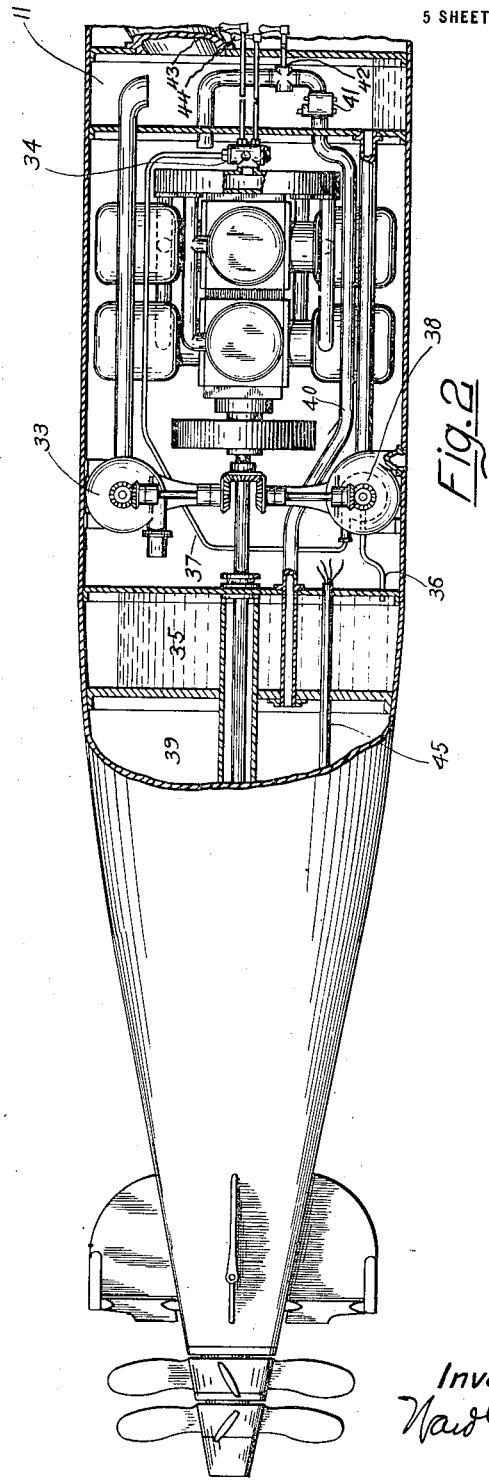
Fig. 2 is a vertical section through a part of a dirigible device, showing a modification of my invention.

In Fig. 2 I have shown a cross-section of a submersible of similar proportions in which is illustrated a means of obtaining air from the atmosphere and after primary compression, storing it in the space corresponding to the engine compartment. There is further illustrated a manual means of maintaining a relatively constant pressure in the engine compartment whether the craft be running on the surface, awash or submerged.

Figure 3:
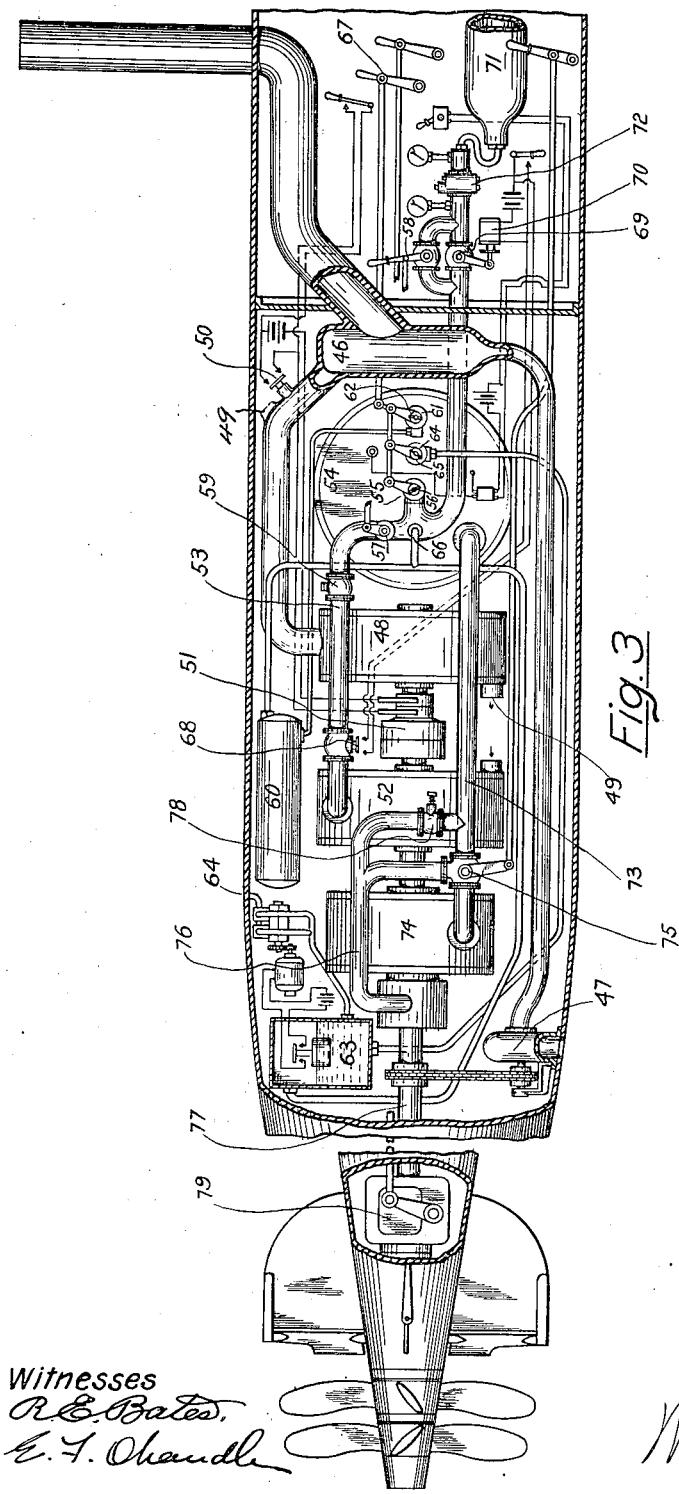
Fig. 3, is a vertical section through a part of a dirigible device, showing another modification of my invention.

In Fig. 3 I have shown a cross-section of a submersible where I have illustrated a means of primary and secondary compression of the air and of supplying a generator by automatically or manually controlled means with a combustion supporting fluid at a relatively constant pressure whether the craft be running on the surface, awash or submerged.

Figure 4:
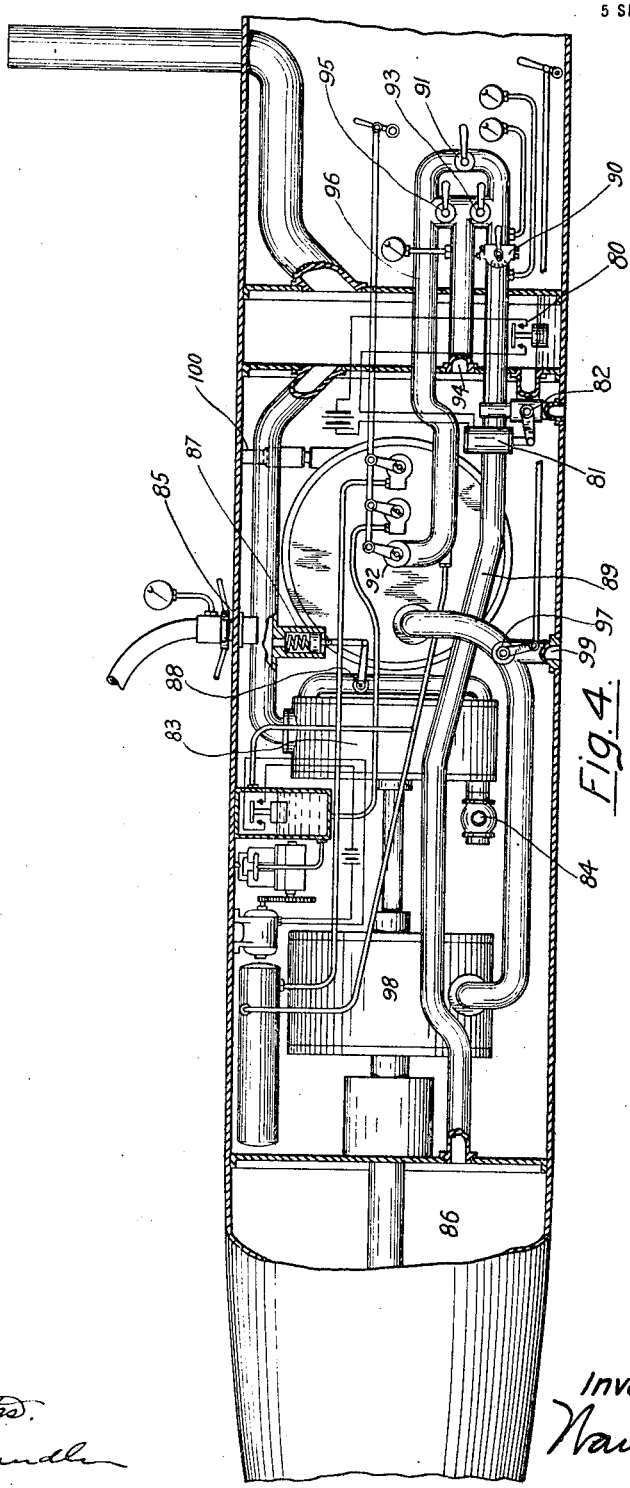
Fig. 4 is a vertical section through a part of a dirigible device showing a further modification of my invention.

In Fig. 4 I have shown a cross-section of a submersible in which I have illustrated a means of precompression in the engine compartment from an outside source, further a means of supplying by primary compression a combustion supporting fluid to a generator at a relatively constant or adjustable pressure whether the craft be running on the surface, awash or submerged.

In Figs. 3 and 4 I have further illustrated a means of supplying fuel and water to the generator at essentially the same pressure at which the combustion supporting fluid is being admitted to the generator. I have further shown a means of obtaining water from the sea and keeping same at the required pressure. I have further shown a means of permitting the generator to exhaust through a safety valve. I have further provided a means for throttling or stopping the engine by by-passing the fluid pressure from the generator around the engine.

In Fig. 5, I have illustrated a method of changing over from atmosphere air as a means of supporting combustion, to compressed oxygen or other compressed carrier of combustion supporting gas.

The invention is illustrated in some of its many possible embodiments and combinations in the accompanying drawings; wherein 1 is a periscope tube in the top of which may be a prism rotated in a complete circle by means not shown in the drawing. 2 is an air duct with a rotary valve in the top 3 from which air may be admitted to duct 2. The entire air-duct-periscope unit 1 and 2 may rock along the arc shown by the dotted line into a channel illustrated at 4. The air valve 3 may be closed by the solenoid 5 when water enters the gap between the spark points shown at 6. At the point 7 there is shown an opening through which air may pass from the air duct 2 to the air duct 8, which carries air to the forward end of the man's compartment for the purpose of supplying him with breathing air. In the main air flow in the duct 10, which carries air from the duct 2 to the compartment 11, is shown a suction tube 9. This suction tube draws air in from the operator's compartment thus causing air to circulate by means of the tube 8. When the absolute pressure in air duct 10 falls below the predetermined point, the valves at 12 and 13 automatically close, avoiding the lowering of the air pressure in the man's compartment to a harmful extent by the suction of the engine driven pump. Obviously the tube 8 could be continued to the top of the periscope in which case the suction tube 12 could be merely an automatic inlet valve. The operator is further provided with oxygen tanks or other air recuperative devices such as used by divers and firemen, not illustrated in the drawing.

I provide a means of closing the atmospheric air intake whenever the water approaches dangerously near same. The contact point shown at 6 may be located at any desired place on the periscope-air-duct or elsewhere, for the purpose of closing the valve shown at 3 not only when the craft desires to submerge but every time the craft passes, because of its high speed or short air duct, through a wave. In the compartment 11 the water which leaks into the air duct at the valve 3 may be thrown off. The water precipitates while the air passes upward through the screen 14 and into the engine compartment, after-body, or other suitable space.

In the embodiment shown when the water in the bottom of the cavity 11 raises the float 15 to a predetermined point it turns on the current at 16 which engages the magnetic clutch 17, thus operating the water pump 18 for the purpose of pumping out the drain water within the cavity 11. Of course this pump could be operated in one of many ways as for instance, with an electric motor which would operate the pump so long as the contact was established at 16.

19 shows a heat engine to which may be attached a mixing valve or carbureter 20 which may obtain a suitable fuel from the tank 21. Manual means of control on the mixing valve are shown at 21$^a$ for throttle, and at 22 for air adjustment, and obviously any others required may be readily provided. 23 is a means such as a gear box for the purpose of obtaining various ratios of engine to propeller speed, or of reversing the propellers without reversing the engine. Obviously some types of suitable engines may be reversed for reversing the propellers. 24 is an electrical unit which may be used for starting the engine or charging batteries, or both, as is the case in automobile practice. The fuel in the tank 21 may be fed to the mixing valve 20 by any suitable means such as one of the three well known methods: gravity, as illustrated; pressure fed, as shown at 25, where compressed air from the tank 26 is supplied through a reduction valve 27 in a constant pressure; or the well-known vacuum feed system, not illustrated. Where water is required it may be fed by these or other suitable means.

Normally, air may be drawn through the air valve 3, through the air ducts 2 and 10, through the cavity 11, through the screen 14, into the after-body by any suitable means from which it may be taken by the mixing valve, fed to the engine and exhausted through the hollow shaft 28 to the tail. When the valve 3 closes, the mixing valve then has the air contained in the after-body of the craft and that contained in the cavity 11 the duct 10 and the duct 2 to draw upon. There should be in this space sufficient air to keep the carbureter supplied at almost normal pressure for a short interval of time after the valve 3 has been temporarily closed by passing through a wave. When the valve opens the reduced absolute air pressure in the after-body would cause the air to rush through the ducts more quickly, reëstablishing the original pressure, and causing little or no lessening of the engine speed. If, however, the valve 3 is kept closed a considerable period of time, with the engine running, air or other combustion supporting medium may be drawn from the supply tank 26 through the reduction valve 29 into the after-body. This supply may be turned on or off by suitable automatically or manually controlled means. I have illustrated solenoid 30 so wired with the solenoid 5 that the two will work simultaneously or at slightly varying but definitely determined intervals. At 31 I have shown retarding means such as a dashpot which makes it possible for the solenoid 5 to close the valve 3 much more quickly than the solenoid 30 can open the valve 32.

Thus the valve 20 may be automatically supplied with air relatively close to atmospheric pressure whether the craft be running awash or submerged.

In Fig. 2 I have shown a means of primary compression of the air into the space which may be called the engine compartment, or into other suitable space. I have shown manual means of adjusting the mixing valve and manual means of changing over from atmospheric air supply to a self-contained combustion supporting medium. Atmospheric air may be supplied to a cavity 11 as in Fig. 1. From cavity 11 it may be pumped by any suitable pumping means as at 33 which compresses it to a desired running pressure in the engine or other suitable compartment. From this compartment this primary compressed air may be fed to the mixing valve 34. Fuel supply 35 may be fed to the same mixing valve through the pipes 36 and 37 by a pumping means shown at the dotted lines 38. This pump may supply a measured quantity of fuel to the mixing valve 34 throughout the running period of the motor by which the fuel may be directly pumped. This pumping means, operably connected to the engine, is only typical of a means for pumping fuel, water, air, oxygen, or other combustion supporting medium direct to carbureter, mixing valve or generator, in quantities proportionate to the speed of the engine, as will be noted by applying this method of supply to the several typical cases illustrated in the Figs. 1 to 5.

Compressed air or other combustion supporting medium may be fed from the supply tank 39 by means of the pipe 40 to a reduction valve shown at 41, from which valve the combustion supporting medium may be fed through the valve 42 to the engine compartment when, owing to the closure of the valve 3 shown in Fig. 1, the pressure in the engine compartment has run below the desired pressure. At 43 and 44 I have shown a manual means of regulating the amount of fuel and combustion supporting fluid fed through the mixing valve 34. This may serve as a throttle, or any other desired throttle may be supplied. At 45 I have shown a tube which carries any means of actuating steering members on the tail of the craft. Any desired means may be used as in standard torpedoes or as here shown, where by means of electric wires, electric or air servo-motors in the tail, control the operation of the rudders.

In Fig. 3 I have shown essentially the same means of supplying air from the atmosphere, of separating the water therefrom and of pumping it into the engine compartment or after-body to a required primary pressure as illustrated in Fig. 2. From this primary pressure I have shown means of compressing to a secondary pressure for use in a gas-steam generator wherefrom the products of combustion and the steam produced by the injection of water, pass together through the engine. I have further illustrated means of supplying the essential elements for combustion at relatively correct pressures under all conditions.

Air may be admitted to the pot 46 by means similar to that illustrated in Fig. 1. Here the water may be eliminated by any desired pumping means, such as pump 47 geared directly to the engine or by a clutch driven pump as illustrated in Fig. 1, or by injector as illustrated in Fig. 4, or by electric motor-driven pump or any other desired means. From the pot 46 air may be compressed by a pump 48 to the engine compartment or after-body or other suitable space in the craft. When the air pressure in the pot 46 falls to a predetermined point below atmosphere pressure owing to the closing of the valve 3 in Fig. 1, means may be provided for completely throwing the pump 48 out of action or for by-passing air through it so it runs idly. I have here illustrated one of the several means: at 50, electric circuit is closed by lowering of pressure in the tube which disengages the magnetic clutch 51. Any other suitable means may be used and a check valve may be supplied at 49 if desired to stop the pressure in the engine compartment from returning to the pot 46. From the engine compartment the air now at its primary pressure may be compressed by a pump 52 through a pipe 53 to a generator 54. The air may be admitted to the generator through a valve 55, after having been adjusted a calibrated amount by an adjustment shown at 56. 57 is a shut-off valve which may be connected by lever to the handle 58. 59 is a check valve which may be used to stop the confined fluid from flowing from the generator to the pump 52.

At 60 I have shown a fuel tank from which fuel may be fed to a jet or nozzle 61, after being calibrated by an adjustment shown at 62. At 63 I have shown a water supply which may be self-contained sufficient for the entire run of the craft, or may be supplied from the sea as at 64 by a pump driven by any suitable means. From the tank water may be fed to a nozzle 64 after having been calibrated by an adjustment 65. From a point 66 on the supply pipe which supplies nozzle 55, pressure tubes may lead to the tank 60 and the tank 63, which provides a means of furnishing fuel, water and combusting supporting fluid at essentially the same, though not necessarily constant pressure, to the generator.

At 67 I have shown a handle or throttle by means of which the jets may be made adjustable at the same ratio or at any desired irregular ratio depending upon the way the valves are linked together. Attachments may be put to the adjusting screws 62, 65 and 56 so that they may be altered at any time from the man's compartment. It is distinctly understood that the jets or valves 61, 64 and 55 may be provided in any desired order, arrangement or number in the generator, and any number of generators may be used.

The pumps 52 and 48 may be so coupled to the engine by clutch or otherwise that they may be automatically or manually released from action or relieved of work when their functions are no longer required owing to the closing of the valve 3 in Fig. 1, and the consequent reduction of primary pressure in the engine compartment. I have provided means whereby, when the pump 52 can no longer supply sufficient pressure to the valve 55, a new supply of air, oxygen or other combustion supporting medium may be admitted automatically or manually to the valve 55. I have illustrated an automatic means wherein an electric circuit is closed as at 68 when the pressure in the pipe 53 falls below a predetermined point. The closing of this circuit opens the valve 69 by means of the solenoid 70. The opening of this valve permits compressed air, oxygen or other combustion supporting fluid to flow from the tank 71 through the reduction valve 72 to the valve 55. Pressure may also be provided manually by use of the valve shown at 58. Valves 57 and 58 may be so connected that when one opens the other closes.

From the generator 54 motive fluid consisting of the products of combustion and the water turned into steam may be carried by the tube 73 to a motor 74 of any suitable type. The valve or throttle 75 may be so constructed that it throttles the fluid passing to the engine and by-passes the remainder through the tube 76 to the hollow shaft 77, from which it and the exhaust from the engine both escape through the tail in the usual torpedo manner, or by any other suitable means. 78 is a safety valve which may permit pressure to by-pass the engine. 79 is a reverse or speed gear by which the speed ratio between the propellers and the engine may be altered or reversed.

In Fig. 4 I have illustrated a method of using only a primary source of compression of atmospheric air for a gas-steam generator and have made it possible to start the generator by a preliminary storage from some outside source.

After the water has been removed from the air by means of a float-made contact 80, a solenoid 81 and compressed air ejector 82, or by any other suitable method, air may be compressed by, e. g., the pump 83, past the check valve 84, into the engine compartment. Air for starting the generator may be obtained by an initial compression thus supplied at the valve 85 to the engine compartment, or may be drawn from any suitable source of compressed air or other combustion supporting medium within the craft itself as at 86. At 87 is shown a pressure device which when the pressure in the tube leading to the pump 83 falls below atmosphere pressure to a predetermined point, opens a valve at 88 which permits the pump 83 to by-pass air about itself, thus enabling it to run idly and require of the engine practically no negative work. This is only one of the many methods of relieving the engine of the duty of running the pump against a vacuum.

From the tank 86 air, oxygen or other combustion supporting fluid is passed through a pipe 89 to a reduction valve 90, which may be set to give any required reduction. From the reduction valve 90 this fluid may be passed by a manually operated valve 91 directly to the inlet of the generator 92 either for the purpose of starting, or supporting the combustion therein. A manually operated valve 93 makes it possible to by-pass combustion supporting fluid from the reduction valve 90 directly into the engine compartment at the point 94. A valve 95, or the like, may be employed to make it possible to turn the compressed fluid from the engine compartment, and thus from the pump 83, into the tube 96, which may lead to the inlet valve 92. A manually operated valve 97 may be used to make it possible to throttle the motor 98 and turn the generated fluid through an auxiliary exhaust port 99. At 100 I have shown an automatic safety valve outlet for the generator.

In Fig. 5, I have shown a container 101 filled with compressed oxygen, liquid oxygen, or other combustion supporting fluid on which there may be a safety valve 102. This safety valve is necessary only in case of liquefied gas. The oxygen or other gas may pass through the pipe 103 to the heater 104. Here the temperature of the gas, which otherwise would be greatly reduced because of expansion, may be raised by any suitable means to any desired temperature. This heating may under some circumstances not be required, but under others it is very desirable. I have illustrated one method of heating the gas as by means of hot water supplied from any desired source such as the jacket of the generator, or from the exhaust, or heated by any other means. This heater may be heated electrically or any other desired way. From the heater the gas may be carried to an adjustable reduction valve 105. At 106 a thermal actuated device may be so attached that when the gas is below a given temperature, the valve at 107 will be opened: when above that given temperature the valve 107 will be closed, thus increasing or decreasing the amount of heat imparted to the gas. This thermal device may be similar to the one used in the cooling systems of motor cars or any other desired form of structure, for automatically furnishing the gas to the generator at any desired temperature.

In the embodiment referred to, whenever a pump driven by the engine as at 83 in Fig. 4 supplies sufficient air for combustion through a pipe 108, a valve 109 is opened, a valve 110 is opened, a valve 111 is closed, a valve 112 is opened, a valve 113 is closed. When the bar 114 is moved a required distance, the opened valves are closed and the closed valves are opened. A valve as at 110 is designed to remain at its widest open position while air is furnished by the pump, and is designed to remain at another position when the stored oxygen carrier is being used. The amount of fluid that might pass through this valve in its first position bears to the amount of gas that might flow through it in its second position, a ratio approximately the same as the oxygen content in air is to the oxygen content of the stored oxygen carrier. When valve 109 is opened and 111 is closed or, in other words, when the generator is being fed with atmospheric air from the pump, the valve 112 is open and pressure approximately the same as at nozzle 115, fills the tube 116 and the tube 117 supplying the water tank 118 and the fuel tank 119 with the same pressure.

In the use of the organization just described, whenever the valve 109 is closed and the valve 111 is opened or, in other words, when the stored oxygen carrier is being supplied to the jet 115, then the valve 112 is closed and 113 is opened, permitting compressed air from a tank 120, preferably reduced through a reduction valve 121 to a pressure approximately the same as the reduction valve 105 is set to give, to flow through a tube 122, and a tube 117, to supply pressure to tanks 118 and 119 at approximately the same pressure as the pressure at which the oxygen carrier is fed to the generator or at any difference in pressure that may be desired.

One of the reasons for this use of compressed air in the tanks 118 and 119 instead of permitting the oxygen carrier to be used therein, is the danger of explosion.

While I have described certain specific embodiments of the invention, it will be obvious that many changes may be made without departing from the spirit of the invention, as defined in the following claims.

I claim:

1. A submersible vessel having partitions forming a compartment, a power generator within said compartment, an atmospheric air-intake, means for pumping air under pressure from said intake and into said compartment and means for maintaining the pressure therein even when said pump is not in operation.

2. A submersible vessel having partitions forming a compartment, a power generator within said compartment, an atmospheric air-intake, means for pumping air under pressure from said intake and into said compartment, and means for cutting the pump out of action when the pressure in said intake falls below a predetermined amount.

3. A submersible vessel having partitions forming a compartment, a power generator within said compartment, an atmospheric air-intake, means for pumping air under pressure from said intake and into said compartment, and means for further compressing the air within said compartment and conducting the same to said generator.

4. A submersible vessel having partitions forming a compartment, a power generator within said compartment, an atmospheric air-intake, means for pumping air under pressure from said intake and into said compartment, fuel and water supply tanks, and means for leading the air, fuel and water to the generator at substantially the same pressure.

5. A submersible vessel having partitions forming a compartment, a power generator within said compartment, an atmospheric air-intake, means for pumping air under pressure from said intake and into said compartment, fuel and water supply tanks, means for leading the air, fuel and water to the generator at substantially the same pressure, and a common throttling device therefor.

6. A submersible vessel having partitions forming a compartment, a power generator within said compartment, an atmospheric air-intake, means for pumping air under pressure from said intake and into said compartment, and means for cutting the pump out of action when the pressure in said intake falls below a predetermined amount, and for simultaneously throwing in an independent supply of oxygen.

7. A submersible vessel having a generator, devices for supplying atmospheric air to said generator, a storage reservoir containing a supply of oxygen under pressure, valves for the above supplies of oxygen, and operating devices for said valves interlocked to throw them selectively into operation.

8. A submersible vessel having a generator, devices for supplying atmospheric air to said generator, a storage reservoir containing a supply of oxygen under pressure, a fuel reservoir connected to said generator, and having valves adapted to subject the same selectively to the pressure of the above supplies of oxygen, valves for the above supplies of oxygen, and operating devices for all of said valves interlocked to throw them selectively into operation.

In testimony whereof I hereunto affix my signature in the presence of two witnesses.

WARD G. LEATHERS.

Witnesses:
   EDW. F. CHANDLER,
   WILLIAM B. COWEN.